No. 837,877. PATENTED DEC. 4, 1906.
R. L. ORCUTT & J. W. WILSON.
APPARATUS FOR CLEANING WALLS AND REMOVING OLD WALL PAPER
THEREFROM.
APPLICATION FILED FEB. 19, 1906.

ATTEST.
H. G. Fletcher.
M. P. Smith.

INVENTORS.
ROBERT LEE ORCUTT.
JAMES W. WILSON.
BY Higdon & Longan
ATT'YS.

UNITED STATES PATENT OFFICE.

ROBERT LEE ORCUTT AND JAMES W. WILSON, OF ST. LOUIS, MISSOURI.

APPARATUS FOR CLEANING WALLS AND REMOVING OLD WALL-PAPER THEREFROM.

No. 837,877.     Specification of Letters Patent.     Patented Dec. 4, 1906.

Application filed February 19, 1906. Serial No. 301,958.

*To all whom it may concern:*

Be it known that we, ROBERT LEE ORCUTT and JAMES W. WILSON, citizens of the United States, and residents of St. Louis, Missouri, have invented certain new and useful Improvements in Apparatus for Cleaning Walls and Removing Old Wall-Paper Therefrom, of which the following is a specification containing a full, clear, and exact description, reference being had to the accompanying drawings, forming a part hereof.

Our invention relates to an apparatus for cleaning walls and removing old wall-paper therefrom; and the object of our invention is to construct a simple inexpensive apparatus or device wherein steam is generated and to provide said device with a nozzle through which the steam discharges.

A further object of our invention is to construct a device which may be carried in the hand and which can be advantageously used in cleaning walls or painted woodwork and which is particularly applicable for use in removing old wall-paper or burlap and like material from walls and ceilings.

To the above purposes our invention consists of certain novel features of construction and arrangement of parts, which will be hereinafter more fully set forth, pointed out in our claims, and illustrated in the accompanying drawings, in which—

Figure 1:
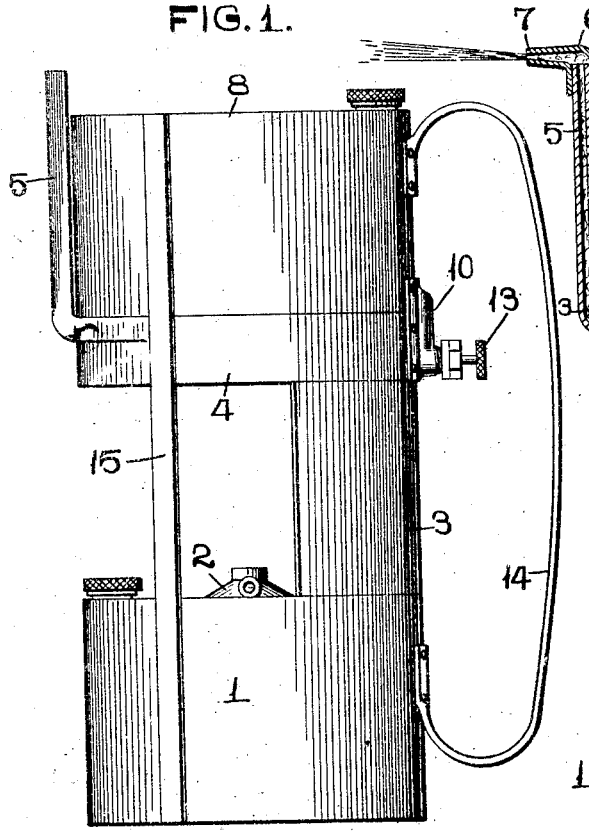
Figure 2:
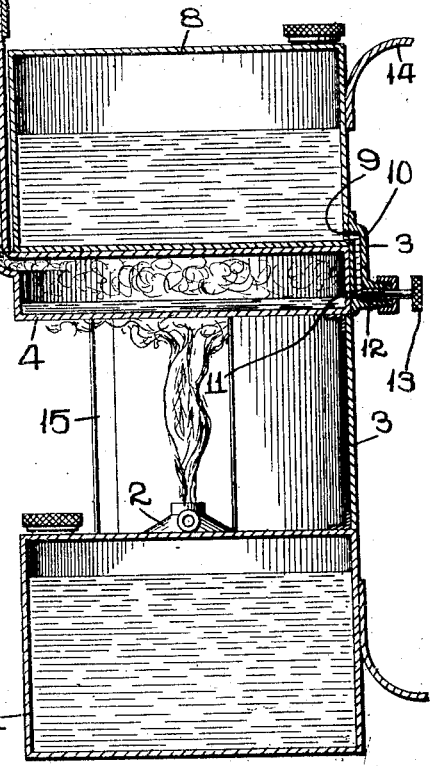
Figure 4:
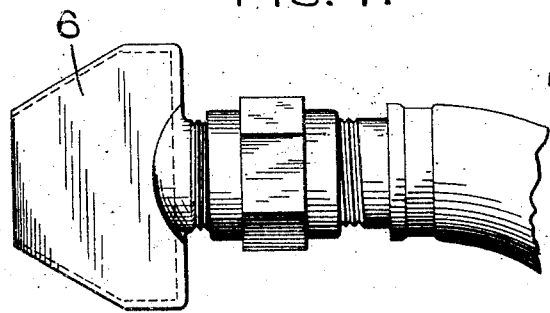
Figure 3:
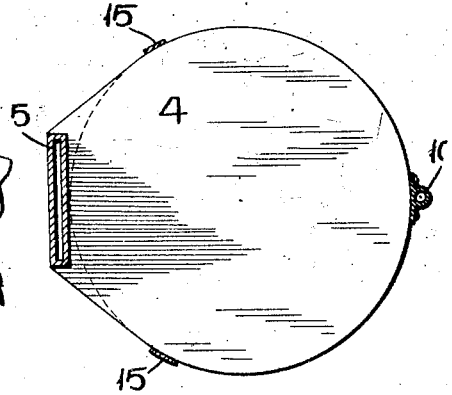

Figure 1 is a side elevation of our improved apparatus with the horizontal nozzle removed from the steam-discharge spout. Fig. 2 is a vertical section taken through the center of our improved apparatus. Fig. 3 is a horizontal section taken on the line 3 3 of Fig. 2. Fig 4 is a plan view of a steam-nozzle that is connected to a flexible tube, such as a hose, and as contemplated by our invention.

Referring by numerals to the accompanying drawings, 1 designates a hydrocarbon-reservoir, which is provided in the center of its top with a suitable burner 2. Extending upwardly from one side of this reservoir 1 is a segmental plate 3, and secured to the upper end thereof is a circular box 4, which forms a steam-chamber. Leading upwardly from the front side of this steam-chamber is a flat tube 5, through which the steam discharges after being generated in the steam-chamber.

6 designates a rectangularly-bent nozzle having a flattened discharge end 7, and which nozzle is detachably positioned on the upper end of the flat tube 5 and is for the purpose of discharging the steam outwardly in a horizontal plane when the entire apparatus is held upright and in use upon vertical surfaces.

Fixed on top of the steam-chamber 4 is a water-reservoir 8, and formed through the side wall at the rear lower end thereof is an outlet 9. Leading downwardly from this outlet 9 is a tube 10, which leads to an inlet-opening 11, formed through the wall at the rear side of the steam-chamber 4. A suitable valve 12 is arranged in the tube 10 for controlling the passage of water through said tube, which valve is operated by a disk 13, having a milled edge.

A strap-handle 14 is fixed at its upper end to the rear side of the reservoir 8 and at its lower end to the rear side of the reservoir 1, and by means of this handle the apparatus is held and manipulated while in use.

A pair of vertically-arranged strengthening-straps 15 connect the front sides of the reservoirs 1 and 8.

Our improved apparatus is prepared for use by partially filling the reservoir 1 with a suitable oil, such as gasolene, and filling the reservoir 8 with water. Pressure is pumped up within the reservoir 1 by a suitable air-pump, and thus the oil in said reservoir is forced out through the burner, where it is ignited, and the flame resulting therefrom is deflected upwardly onto the under surface of the steam-chamber 4. The valve 12 is slightly opened, so as to allow a small amount of water to discharge into the steam-chamber, and said water will become quickly heated and transformed into steam. The steam leaving the chamber 4 will pass upwardly through the tube 5 and will discharge from the upper end thereof against the woodwork or onto the wall-paper, against which the upper end of the tube 5 is held. When the nozzle 6 is positioned on the upper end of the tube 5, the steam will be discharged horizontally onto the woodwork that is being cleaned or onto the old wall-paper that is being removed. The valve 12 can be opened whenever it is desired to replenish the water-supply in the steam-chamber 4, or said valve can be slightly opened, so that a small quantity of water will feed continuously into the steam-chamber. The hot steam discharging from the end of the tube 5 or from the flattened end 7 of the nozzle 6 quickly softens the paste of the old wall-paper, so that said paper can be easily and quickly removed from the walls and ceilings. The steam-jet can also be discharged directly onto walls or painted woodwork to assist in removing dust and other foreign matter therefrom.

In Fig. 4 we have shown a steam-nozzle detachably secured to a flexible tube, and by this construction steam can be taken from a radiator or other suitable source of steam-supply.

By our improved apparatus painted or frescoed walls and ceilings and painted woodwork can be very readily and efficiently cleaned, and a jet of steam may be discharged at whatever point desired in cleaning walls and ceilings and removing wall-paper and similar covering therefrom.

The apparatus is very simple in construction, is very compact, can be easily handled, and is very efficient in use.

We claim—

1. In an apparatus of the class described, a steam-chamber, a steam-discharge pipe leading therefrom, a heating device arranged beneath the steam-chamber, a water-reservoir located above the steam-chamber, a tubular connection from the water-reservoir to the steam-chamber, and a valve located in said tubular connection; substantially as specified.

2. In an apparatus of the class described, a steam-chamber, a heating device connected to and located beneath the steam-chamber, a water-reservoir connected to and adjacent the steam-chamber, a steam-discharge pipe leading from the steam-chamber, a steam-discharge nozzle detachably positioned on the end of the pipe, a tubular connection from the water-reservoir to the steam-chamber, and a valve for controlling the passage of water through said tubular connection; substantially as specified.

3. In an apparatus of the class described, a hydrocarbon-burner, a steam-chamber located above said burner, a tube leading upwardly from said steam-chamber, a horizontally-disposed nozzle detachably seated on the upper end of said tube, a water-reservoir positioned on top of the steam-chamber, a tubular connection leading from the water-reservoir into the steam-chamber, a valve for controlling the passage of water through the tubular connection, and a handle connecting the water-reservoir and the burner; substantially as specified.

In testimony whereof we have signed our names to this specification in presence of two subscribing witnesses.

ROBERT LEE ORCUTT.
JAMES W. WILSON.

Witnesses:
M. P. SMITH,
JOHN C. HIGDON.